(12) United States Patent
Schlueter et al.

(10) Patent No.: US 9,321,139 B2
(45) Date of Patent: Apr. 26, 2016

(54) DEVICE AND METHOD FOR TESTING A DRILLING/RIVET COUNTERSINKING PROCESS CARRIED OUT BY A DRILLING/FEED UNIT

(71) Applicant: Airbus Operations GmbH, Hamburg (DE)

(72) Inventors: Guenter Schlueter, Seevetal (DE); Heinrich Pahl, Jork (DE)

(73) Assignee: Airbus Operations GmbH, Hamburg (DE)

( * ) Notice: Subject to any disclaimer, the term of this patent is extended or adjusted under 35 U.S.C. 154(b) by 97 days.

(21) Appl. No.: 14/332,975

(22) Filed: Jul. 16, 2014

(65) Prior Publication Data
US 2015/0020397 A1   Jan. 22, 2015

(30) Foreign Application Priority Data

Jul. 22, 2013   (DE) .......................... 10 2013 214 295

(51) Int. Cl.
*G01B 5/00* (2006.01)
*B23Q 17/22* (2006.01)
*B21J 15/14* (2006.01)
*B21J 15/28* (2006.01)

(52) U.S. Cl.
CPC ........... *B23Q 17/2233* (2013.01); *B21J 15/142* (2013.01); *B21J 15/28* (2013.01); *G01B 5/0004* (2013.01)

(58) Field of Classification Search
CPC .......................... B23Q 17/2233; G01B 5/0004
USPC .............................................. 33/613, 645, 638
See application file for complete search history.

(56) References Cited

U.S. PATENT DOCUMENTS

| 3,358,375 | A | * | 12/1967 | Lutz | ................... B23Q 17/2266 33/638 |
| 4,035,099 | A | * | 7/1977 | Friederichs | ........... B23B 47/287 33/638 |
| 6,901,680 | B2 | * | 6/2005 | Locaputo | ............... B23Q 3/005 33/642 |
| 7,549,827 | B2 | * | 6/2009 | Siegfried | .............. B23B 47/287 33/562 |
| 2003/0207742 | A1 | * | 11/2003 | Hazlehurst | ............ B21C 51/005 483/36 |
| 2015/0020397 | A1 | * | 1/2015 | Schlueter | ........... B23Q 17/2233 33/638 |

FOREIGN PATENT DOCUMENTS

DE   102007033153   1/2008

OTHER PUBLICATIONS

German Search Report, Jul. 22, 2013.

* cited by examiner

*Primary Examiner* — Yaritza Guadalupe-McCall
(74) *Attorney, Agent, or Firm* — Greer, Burns & Crain Ltd.

(57) ABSTRACT

A test device and a test method for testing a drilling/rivet countersinking process carried out by a drilling/feed unit, a base body with at least one receiving groove and at least one turret mechanism with receiving openings being provided, the at least one turret mechanism being rotatably provided with respect to the base body in such a way that a predetermined receiving opening can be adjusted to align with the at least one receiving groove.

19 Claims, 6 Drawing Sheets

DEVICE AND METHOD FOR TESTING A DRILLING/RIVET COUNTERSINKING PROCESS CARRIED OUT BY A DRILLING/FEED UNIT

CROSS-REFERENCES TO RELATED APPLICATIONS

This application claims the benefit of the German patent application No. 10 2013 214 295.1 filed on Jul. 22, 2013, the entire disclosures of which are incorporated herein by way of reference.

BACKGROUND OF THE INVENTION

The present invention relates to a device and a method for testing a drilling/rivet countersinking process carried out by a drilling/feed unit, in particular for the aerospace sector.

Although applicable to various types of rivets, the present invention and the problems on which it is based will be described in more detail in relation to a lockbolt rivet.

In aircraft construction, riveting is one of the most important types of connection in order, in particular, to connect sheet metal parts made, for example, of light metal alloys or other materials to one another. In this case, the rivet connections have to fulfill certain guidelines in order to be able to ensure a predetermined quality of the rivet connection and absorption of the forces occurring on the aircraft when loaded. Consequently, it is necessary to subject the rivet connections to a specific test method. It has proven to be advantageous here to accordingly test and adjust the drilling/feed machines used later at construction sites on a test device beforehand so that the required quality of the rivet connection is automatically ensured during the actual use at the construction sites. As different drilling/feed machines are used for different rivet connections, these machines used have to be correspondingly tested and preadjusted individually in each case beforehand. An additional difficulty is that the drilling/feed machine cannot be correctly adjusted on the original component as, because of strict regulations, no rivet connection may exist that does not fulfill the quality requirements of this rivet connection. Consequently if the checking of the rivet connection shows that this rivet connection does not comply with the quality standard, this faulty rivet connection would have to be laboriously removed and a corresponding non-conformity report made.

SUMMARY OF THE INVENTION

It is one idea of the present disclosure to provide a device and a method, which fulfill the requirements mentioned above in an easy and economical manner.

The idea on which the present invention is based consists inter alia in providing a test device for testing a drilling/rivet countersinking process carried out by a drilling/feed unit, in particular for the aerospace sector, which has: a base body, which has at least one receiving groove to receive a test strip; and at least one turret mechanism, which is rotatably attached to the base body, at least partially overlapping a receiving groove, and has a plurality of differing receiving openings to receive different drilling/feed units; the at least one receiving groove of the base body and the plurality of receiving openings of the turret mechanism being arranged in such a way that each individual one of the plurality of receiving openings can be adjusted by corresponding rotation of the turret mechanism to align with the at least one receiving groove.

Furthermore, the idea on which the present invention is based comprises providing a method for testing a drilling/rivet countersinking process carried out by a drilling/feed unit, in particular for the aerospace sector, having the following method steps: inserting a test strip in at least one receiving groove of a base body of a test device, which is configured as described above; rotating the at least one turret mechanism in such a way that a predetermined receiving opening of the at least one turret mechanism aligns with the at least one receiving groove; carrying out a drilling/rivet countersinking process by means of a drilling/feed unit associated with the predetermined receiving opening; removing the test strip from the test device; drawing in the countersunk rivet; and checking the excess or shortfall length of the drawn-in rivet.

Therefore, the present disclosure provides the advantage that the test strip can easily be removed from the test device and even with a drawn-in rivet can easily be inserted again into the test device for a renewed test process. A breaking open of the rivet connection for a renewed test process is not necessary. This advantageously provides a lower test outlay, lower material wear and lower test costs.

According to one development, the at least one receiving groove is configured as a groove profiled in two stages, the first stage being used to support a received test strip and the second stage being used to receive a closing ring and/or bolt portion of an already drawn-in rivet. This two-stage configuration advantageously ensures that the test strip meets with a stable counter-contact for the drilling/rivet countersinking process, so the drilling/riveting process can be carried out in accordance with the high requirements. Furthermore, this two-stage configuration ensures the receiving, for example, of a closing ring, so the rivet(s) already drawn into the test strip are received and guided in this second stage on introduction of the test strip into the test device. Consequently, these rivets that have already been drawn in beforehand do not have to be laboriously removed again from the test strip. This saves time and improves material wear optimization.

According to a further configuration, the test device has locking means to lock the at least one turret mechanism. For example, the locking means comprise clamping jaws to clamp the at least one turret mechanism in a predetermined position, which clamping jaws can be released or tightened by means of associated clamping levers. A simple locking of the turret mechanism is thus achieved, which ensures an adjustment or rotation or a locking of the turret mechanism with a low outlay in terms of work and time. Furthermore, the locking means can preferably have latching mechanisms for the defined latching of the at least one turret mechanism in a predetermined latching position on rotation of the at least one turret mechanism. As a result, the user advantageously experiences haptic and/or acoustic feedback for specifically reached latching positions, in which specific receiving openings precisely align with one or more correspondingly associated receiving grooves. These latching mechanisms consist, for example, of latching balls that are radially offset with respect to one another on the at least one turret mechanism, which latch in associated latching recesses on the base body of the test device. A kinematic reversal of this principle is obviously also possible.

According to a further embodiment, the receiving openings of the a least one turret mechanism are formed by means of rigidly formed-on, for example rigidly burnt-in, clamping bushes or by means of exchangeable clamping bushes. The exchangeable clamping bushes are preferably secured against rotation by means of a screw securing device. The predetermined drilling/feed units can thus be inserted in associated clamping bushes of the turret mechanism and secured against rotation. As a result, the at least one turret mechanism, and therefore the entire test device, can be reequipped in a simple and rapid manner for drilling/feed units to be correspondingly checked.

According to a further embodiment, the receiving openings of the at least one turret mechanism in each case have a coding for the association of a specific receiving opening with a specific drilling/feed unit. It is thus possible for each receiving opening or each clamping bush to be assigned a specific drilling/feed unit. This coding or assignment can be stored in certain tables, preferably together with the optimized operating adjustments determined by means of the test device for the respectively associated drilling/feed units.

According to a further embodiment, a first turret mechanism and a second turret mechanism are arranged one behind the other in the direction of the at least one receiving groove. In this case, the first and second turret mechanism may in each case have, for example, the same number of, for example six, receiving openings that all differ from one another with respect to the internal diameter. However, it is also obvious to a person skilled in the art that all the variations are possible here, in other words, the turret mechanisms may also have a number of receiving openings differing from one another, more or less than six receiving openings and receiving openings with the same internal diameter, if this should be desired.

Furthermore, a first receiving groove and a second receiving groove are advantageously provided parallel to one another, the first and the second receiving groove being able to be configured as a continuous groove or as a groove offset on one side. As a result, a simple introduction or removal of a test strip into or from the test device is advantageously ensured.

According to a further embodiment, the first and second receiving groove and the receiving openings of the first and second turret mechanisms are arranged in such a way that a first receiving opening of the first turret mechanism aligns with the first receiving groove, a second receiving opening of the first turret mechanism aligns with the second receiving groove, a first receiving opening of the second turret mechanism aligns with the first receiving groove and a second receiving opening of the second turret mechanism aligns with the second receiving groove by corresponding rotation of the first and second turret mechanisms. As a result, it is advantageously ensured that, for example, in each case up to two drilling/rivet countersinking processes with a total of up to four different drilling/feed units can be carried out on two test strips provided simultaneously in the test device, without having to remove the test strips from the test device between the individual drilling/rivet countersinking processes by means of the individual drilling/feed units. This is, in particular in a test of a plurality of drilling/feed units, associated with an advantageous gain in time and consequently lower test costs.

According to a further embodiment, after a specific test process, the countersinking depth adjustment of the checked drilling/feed unit is optionally readjusted depending on the test result. This takes place until the measured countersinking depth of the countersunk rivet has reached a predetermined desired value, in other words until the actual and desired value match one another. As a result, an optimized countersinking depth adjustment of the drilling/feed unit to be checked can easily and economically be determined and stored, so a riveting process with the required rivet connection quality is delivered at the actual construction sites by means of the checked drilling/feed units with the adjustments determined beforehand.

BRIEF DESCRIPTION OF THE DRAWINGS

The invention will be described in more detail below with the aid of embodiments with reference to the accompanying figures of the drawings.

In the figures.

In the figures of the drawing, the same reference numerals designate the same or functionally the same component, if nothing is stated to the contrary.

DETAILED DESCRIPTION OF THE PREFERRED EMBODIMENTS

Figure 1:
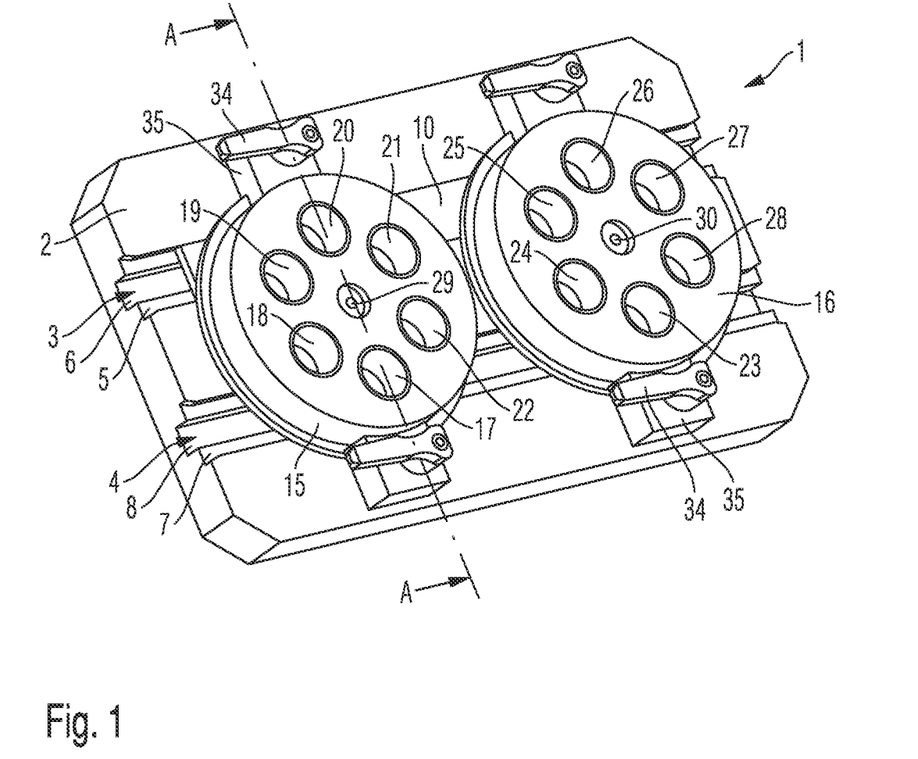
FIG. 1 shows a schematic, perspective view of a test device according to an embodiment of the present invention.
Figure 2:
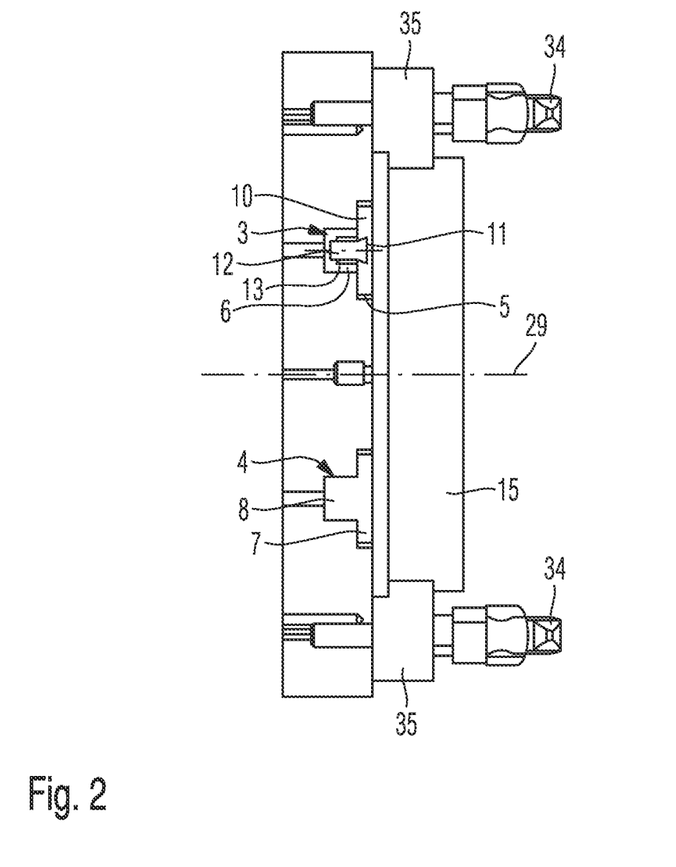
FIG. 2 shows a cross-sectional view of the test device from FIG. 1 along the section line A-A.
Figure 3:
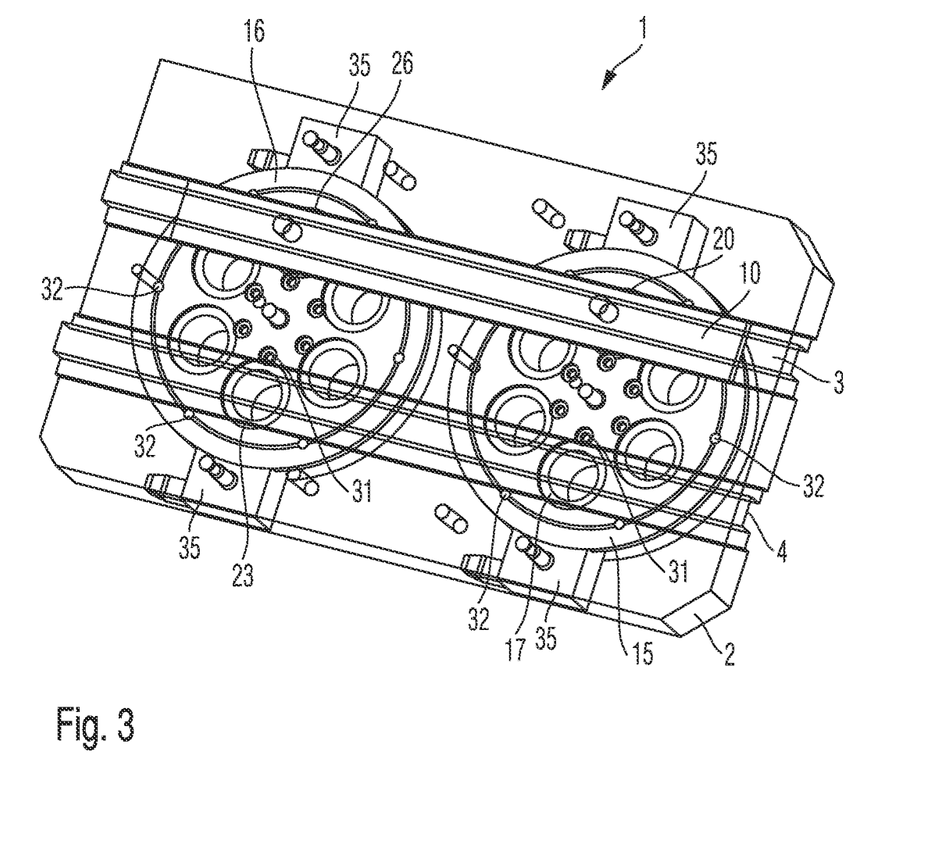
FIG. 3 shows a rear view of the test device from FIG. 1.
Figure 4:
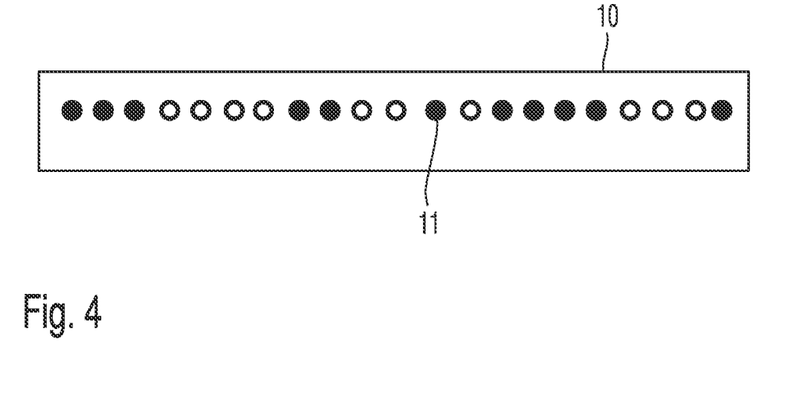
FIG. 4 shows a front view of an exemplary test strip with lockbolt rivets already drawn in according to an embodiment of the present invention.
Figure 5:
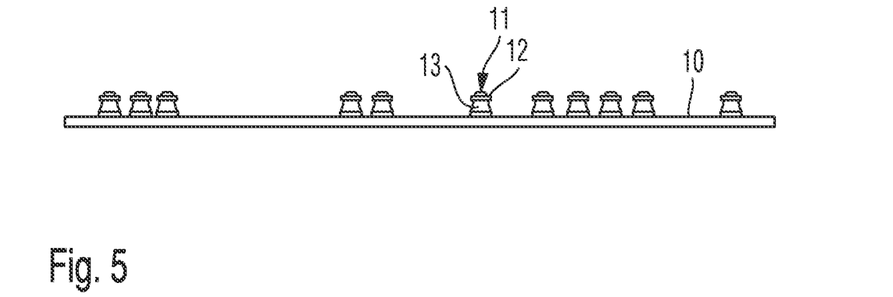
FIG. 5 shows a side view of the test strip from FIG. 4.

As can be seen from FIGS. 1 to 3, the test device 1 according to the first embodiment of the present invention has a base body 2, which may be configured from a solid material such as, for example, steel or the like. The base body 2 may have the shape of a test plate, which, viewed in the longitudinal direction, has two receiving grooves arranged parallel to one another and worked into the surface, a first receiving groove 3 and a second receiving groove 4. Each receiving groove 3, 4 may be configured as a two-stage groove, the first stage 5 or 7 in each case being used as a contact face for contact with and for receiving an associated test strip 10. The second stage 6 or 8 of each receiving groove 3, 4 may be used as a receiver for a bolt portion 12 and/or a closing ring 13 of an already drawn-in rivet 11. Consequently, when the test strip 10 is removed or reinserted in a receiving groove 3, 4, the bolt portion 12 or the closing ring 13 of the already drawn-in rivet 11, is in each case guided in the free space formed by the second stage 6, 8.

For facilitated insertion and removal of the respective test strips 10, the first receiving groove 3 and the second receiving groove 4 may be configured as a continuous groove. However, it is obvious to a person skilled in the art that the first receiving groove 3 and/or the second receiving groove 4 can also, for example, be configured as a groove that is offset on one side.

As illustrated particularly in FIGS. 1 and 3, the test device 1 according to the embodiment shown in these figures has two turret mechanisms, a first turret mechanism 15 and a second turret mechanism 16. Each turret mechanism 15, 16 may be configured as an approximately disc-shaped mechanism with a plurality of receiving openings 17-22 or 23-28 and may be made of a solid material, such as, for example, steel or the like.

The first turret mechanism 15 is rotatable about a first rotational axis 29 according to the present embodiment and the second turret mechanism 16 is rotatable about a second rotational axis 30. The two rotational axes 29, 30 may be configured parallel to one another.

Figure 6:
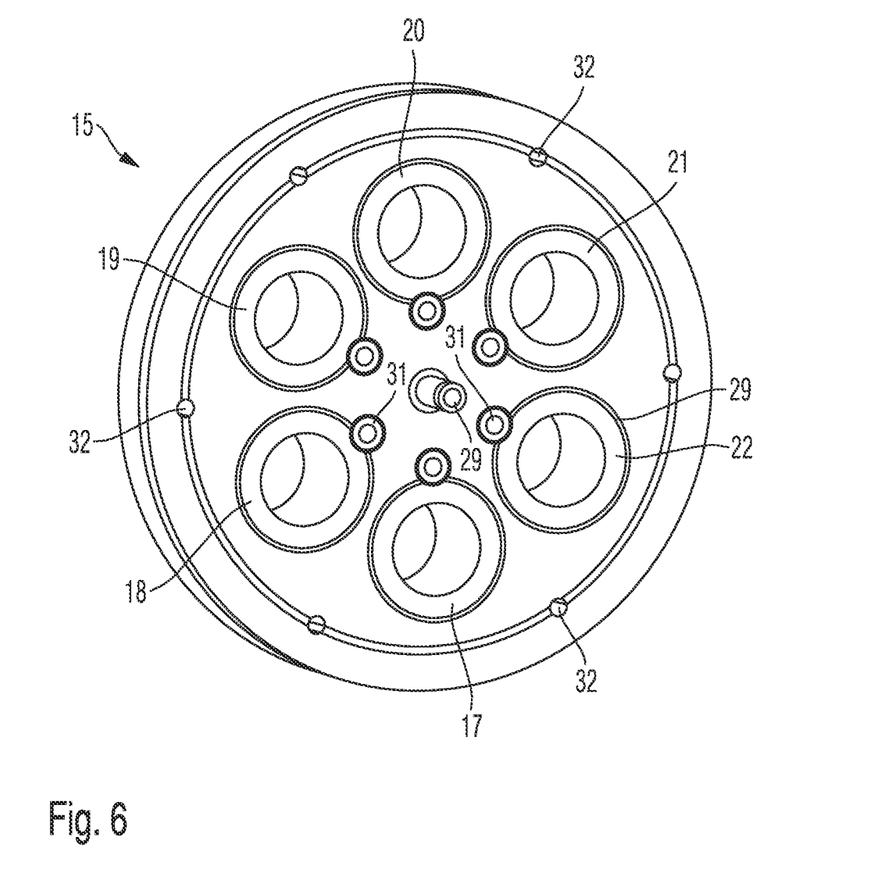
FIG. 6 shows a schematic, perspective view of a turret mechanism according to another embodiment of the present invention.

Furthermore, the receiving openings 17-22 or 23-28 are configured as rigidly burnt-in clamping bushes or, as illustrated particularly in FIG. 6, as exchangeable clamping bushes. In the latter case, with reference to FIG. 6, screw securing devices 31 may be provided, which secure the individual exchangeable clamping bushes against a rotation in an inserted position. By releasing the screw securing device 31, the respective clamping bush can be removed from the turret mechanism 15 or 16 and exchanged for a clamping bush having a differing internal diameter. As a result, each turret mechanism 15, 16 can be easily and economically designed, for example, with a plurality of clamping bushes differing with respect to their internal diameter in such a way that different drilling/feed units can be checked with one and the same turret mechanism or test device.

Furthermore, each turret mechanism 15, 16 may have a plurality of latching mechanisms 32, which latch in respectively associated counter-latching mechanisms on the base body 2 of the test device 1 in discrete positions of the respective turret mechanism 15, 16 for the latter to latch in, for example, in an audible and/or tactile manner. These latching mechanisms consist, for example, of latching balls 32, which are radially offset with respect to one another on the respective turret mechanism, which can latch into associated latching recesses on the base body 2 of the test device 1. A kinematic reversal of this principle is obviously also possible. As a result, the user can adjust and latch the respective turret mechanism 15, 16, in each case, in a desired discrete position in such a way that the clamping bush associated with the drilling/feed unit to be checked is positioned in the desired test position.

FIG. 2 illustrates by way of example the first turret mechanism 15. However, it is obvious to a person skilled in the art that the second turret mechanism 16 can be configured analogously.

Furthermore, clamping mechanisms may be provided on the base body 2, which lock the respective turret mechanism 15, 16 in the respective adjusted operating positions. In this case, the clamping mechanisms may, for example, be configured as clamping jaws 35 that can be actuated by means of clamping levers 34, as shown particularly in FIG. 1. According to the embodiment shown in FIG. 1, two clamping jaws and two clamping levers are in each case provided in an opposing manner for each turret mechanism 15, 16 for the locking thereof. However, it is obvious to a person skilled in the art that other clamping mechanisms can also be used, as long as a release and locking of the turret mechanisms is ensured in predetermined positions.

The individual receiving openings 17-22 or 23-28 of the two turret mechanisms 15, 16 in cooperation with the respective latching mechanisms 32 are provided according to the first embodiment of the present invention in such a way that in the discretely adjustable positions of the turret mechanisms 15, 16, in each case, a first receiving opening 20 of the first turret mechanism 15 aligns with the first receiving groove 3, a second receiving opening 17 of the first turret mechanism 15 aligns with the second receiving groove 4, a first receiving opening 26 of the second turret mechanism 16 aligns with the first receiving groove 3 and a second receiving opening 23 of the second turret mechanism 16 aligns with the second receiving groove 4, as is illustrated, for example, in FIG. 1. By way of example, each turret mechanism 15, 16 has six receiving openings, which are arranged concentrically about the respective rotational axis 29, 30 and which are arranged, for example, in each case, at an angular spacing of 60° from one another. However, it is obvious to a person skilled in the art that a different number of receiving openings can also be provided and the number of receiving openings may also differ from one another amongst the individual turret mechanisms. It is only decisive that the turret mechanisms can in each case be latched or locked in positions of this type and that at least one receiving opening of the turret mechanism aligns with an associated receiving groove for a drilling/rivet countersinking process in the inserted test strip 10.

Reference should be made at this point to the fact that using the test device 1 according to the present embodiment in a test position with two test strips used in the receiving grooves 3, 4, up to four different drilling/feed units can be checked simultaneously without the test strips having to be removed from the test device between a use of the different drilling/feed units.

It is obvious to a person skilled in the art that the same drilling/feed unit can also be checked with the present test device 1 with different countersinking depth adjustments without the test strips having to be removed from the test device 1. For this, the corresponding receiving openings may have the same internal diameter, which is associated with the drilling/feed unit to be checked in each case for a receiver thereof.

Figure 7:
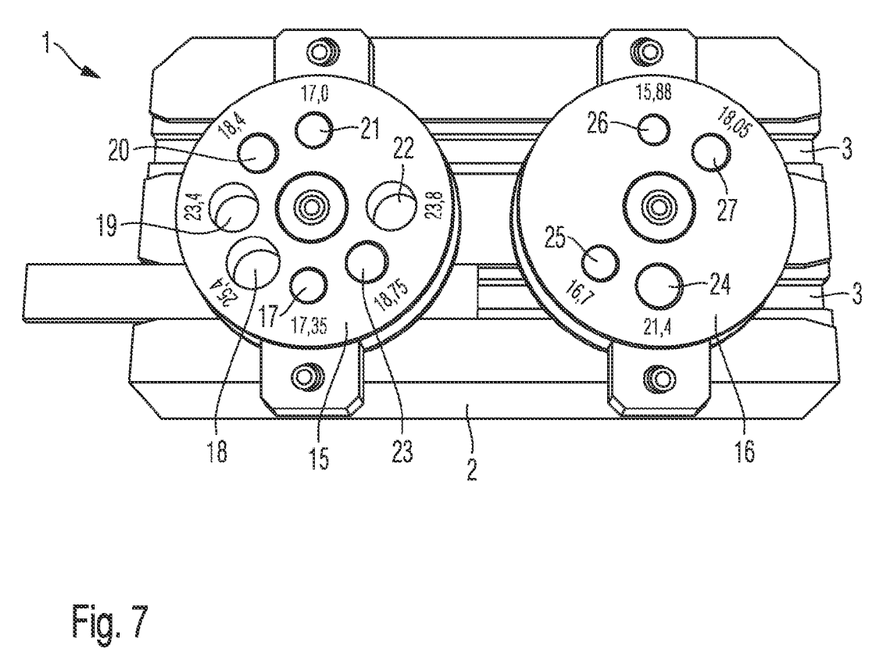
FIG. 7 shows a front view of a test device according to yet another embodiment of the present invention.

In contrast to the first embodiment, the turret mechanisms 15, 16 according to a second embodiment of the present disclosure, with reference to FIG. 7, do not have the same number of receiving openings in each case, but the first turret mechanism 15 is by way of example configured with seven receiving openings differing with respect to the internal diameter and the second turret mechanism 16 is configured with only four receiving openings differing with respect to the internal diameter. It is obvious to a person skilled in the art that all the configurations of the receiving openings proving to be advantageous are conceivable here, in particular the respective number of receiving openings of each turret mechanism as well as the individual internal diameters of the receiving openings. These are advantageously adapted to the respective application.

In the embodiment according to FIG. 7, each receiving opening 17-27 is assigned a specific coding. For example, each receiving opening 17-27 is assigned the exact internal diameter, as illustrated in FIG. 7. This can obviously also be analogously applied to the first embodiment. It is also obvious to the person skilled in the art that any other coding can also be used.

An exemplary method for carrying out a corresponding test of one or more drilling/feed units will be described in more detail below with reference to the test devices described above.

A test strip 10 is preferably used, which is manufactured from the original material of the structures to be riveted later. For example, a test strip is used having the dimensions 30×4.2×300 mm with corresponding surface protection, as also used in aircraft construction. This test strip is inserted in one of the two receiving grooves, for example in the first receiving groove 3.

It is assumed for the following exemplary explanations that a receiving opening or a clamping bush with an internal diameter of 17.35 mm is associated with the drilling/feed unit to be tested. Consequently, the clamping levers 34 of the first turret mechanism 15 or the differently configured clamping mechanisms are released, so the clamping jaws 35 release the turret mechanism 15 for a rotation thereof. The turret mechanism 15 is then rotated with the aid of the latching mechanisms 32 in such a way that the clamping bush or receiving opening associated with the drilling/feed unit to be tested is positioned above the received test strip 10. In the embodiment according to FIGS. 1 to 3, the receiving opening 20 is arranged by way of example above the test strip 10, the receiving opening 17 being positioned accordingly by way of example in the embodiment according to FIG. 7.

The clamping jaws 35 are subsequently adjusted by corresponding actuation of the clamping levers 34 in order to lock the turret mechanism 15 in the predetermined position. The drilling/feed unit to be tested is then introduced into the correspondingly associated receiving opening and a drilling and countersinking process of a corresponding rivet 11 is carried out.

After the drilling and countersinking process, the test strip 10 is removed from the test device 1. By way of example for the event that the countersunk rivet 11 is a lockbolt rivet, the latter can now be drawn in and the closing ring 13 correspondingly attached. The excess or shortfall length of the rivet is then measured. An optical measuring mechanism can, for example, be used for this. After evaluation of the determined countersinking depth, the drilling/feed unit used is readjusted if necessary in the event that the actual value of the countersinking depth has not reached a predetermined desired value. If the actual value of the countersinking depth has reached the predetermined desired value, the adjustment of the drilling/feed unit used is stored and deposited in a corresponding system.

In the event of readjustment, the above-described test process may be repeated with the drilling/feed unit used until the measured actual value has reached the predetermined desired value.

The advantage of the test device according to the invention is now, inter alia, that following a first test process and a lockbolt rivet already having been drawn into the test strip, the latter does not have to be removed from the test strip for a further test process, but the test strip with the lockbolt rivet still drawn in can be inserted into the test device 1 again. This is ensured by the two-stage receiving grooves 3, 4, which accordingly receive the projecting portion of the already drawn-in lockbolt rivet. For a further test process, the test strip 10 is merely inserted in a position such that a region of the test strip 10 that is not yet riveted aligns with a predetermined receiving opening.

As each receiving opening is advantageously assigned a specific coding, a predetermined drilling/feed unit is correspondingly associated with each coding. Thus, for example, the determined adjustment for an optimized drilling/countersinking process can be advantageously stored, for example, in a table of each receiving opening and therefore each drilling/feed unit.

Although the present invention was described in the present case with the aid of preferred embodiments, it is not limited thereto, but can be modified in diverse ways.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A device for testing a drilling/rivet countersinking process carried out by a drilling/feed unit, comprising:
    a base body having at least one receiving groove to receive a test strip; and
    at least one turret mechanism rotatably attached to the base body, at least partially overlapping a receiving groove, and having a plurality of differing receiving openings to receive different drilling/feed units,
    wherein the at least one receiving groove of the base body and the plurality of receiving openings of the at least one turret mechanism are arranged in such a way that each of the plurality of receiving openings are adjustable by corresponding rotation of the at least one turret mechanism to align with the at least one receiving groove.

2. The test device according to claim 1, wherein the at least one receiving groove is configured as a groove profiled in two stages, the first stage being used to support a received test strip and the second stage to receive at least one of a closing ring and a bolt portion of a rivet that has already been drawn in.

3. The test device according to claim 1, further comprising a locking device to lock the at least one turret mechanism.

4. The test device according to claim 3, wherein the locking device has clamping jaws to clamp the at least one turret mechanism in a predetermined position, which clamping jaws can be released or tightened by means of associated clamping levers.

5. The test device according to claim 3, wherein the locking device includes latching mechanisms for the defined latching of the at least one turret mechanism in a predetermined latching position on rotation of the at least one turret mechanism.

6. The test device according to claim 1, wherein the receiving openings are configured by rigidly formed-on clamping bushes.

7. The test device according to claim 6, wherein the receiving openings are rigidly burnt-in.

8. The test device according to claim 1, wherein the receiving openings are configured by exchangeable clamping bushes.

9. The test device according to claim 8, wherein the exchangeable clamping bushes are secured against rotation by means of a screw securing device.

10. The test device according to claim 9, wherein the first and second turret mechanisms in each case have the same number of receiving openings, which all differ from one another with respect to diameter.

11. The test device according to claim 10, wherein the first and second turret mechanisms have six receiving openings.

12. The test device according to claim 1, wherein the receiving openings in each case have a coding to associate a specific receiving opening with an associated drilling/feed unit.

13. The test device according to claim 1, wherein a first turret mechanism and a second turret mechanism are arranged one behind the other in the direction of the at least one receiving groove.

14. The test device according to claim 1, wherein a first receiving groove and a second receiving groove are provided substantially parallel to one another, the first receiving groove and the second receiving groove in each case being configured as a continuous groove.

15. The test device according to claim 14, wherein the first and second receiving groove and the receiving openings of the first and second turret mechanisms are arranged in such a way that a first receiving opening of the first turret mechanism aligns with the first receiving groove; a second receiving opening of the first turret mechanism aligns with the second receiving groove; a first receiving opening of the second turret mechanism aligns with the first receiving groove; and a second receiving opening of the second turret mechanism aligns with the second receiving groove by corresponding rotation of the first and second turret mechanisms, in each case.

16. The test device according to claim 1, wherein a first receiving groove and a second receiving groove are provided substantially parallel to one another, the first receiving groove and the second receiving groove in each case being configured as a groove offset on one side.

17. A method for testing a drilling/rivet countersinking process carried out by a drilling/feed unit, comprising:
- inserting a test strip in at least one receiving groove of a base body of a test device having at least one turret mechanism rotatably attached to the base body, at least partially overlapping the receiving groove, and having a plurality of differing receiving openings to receive different drilling/feed units, wherein the at least one receiving groove of the base body and the plurality of receiving openings of the at least one turret mechanism are arranged in such a way that each of the plurality of receiving openings are adjustable by corresponding rotation of the at least one turret mechanism to align with the at least one receiving groove,
- rotating the at least one turret mechanism of the test device in such a way that a predetermined receiving opening of the at least one turret mechanism aligns with at least one receiving groove;
- carrying out a drilling/rivet countersinking process by means of a drilling/feed unit associated with the predetermined receiving opening;
- removing the test strip from the test device;
- drawing in the countersunk rivet; and
- checking the excess or shortfall length of the drawn-in rivet.

18. The method according to claim 17, wherein the countersinking depth adjustment of the drilling/feed unit is readjusted depending on the test result.

19. The method according to claim 17, wherein the optimized countersinking depth adjustment of the checked drilling/feed unit is stored together with the coding of the associated receiving opening.

\* \* \* \* \*